Aug. 12, 1924.
R. V. FUSCO
1,504,683
GAUGE
Filed April 25, 1921
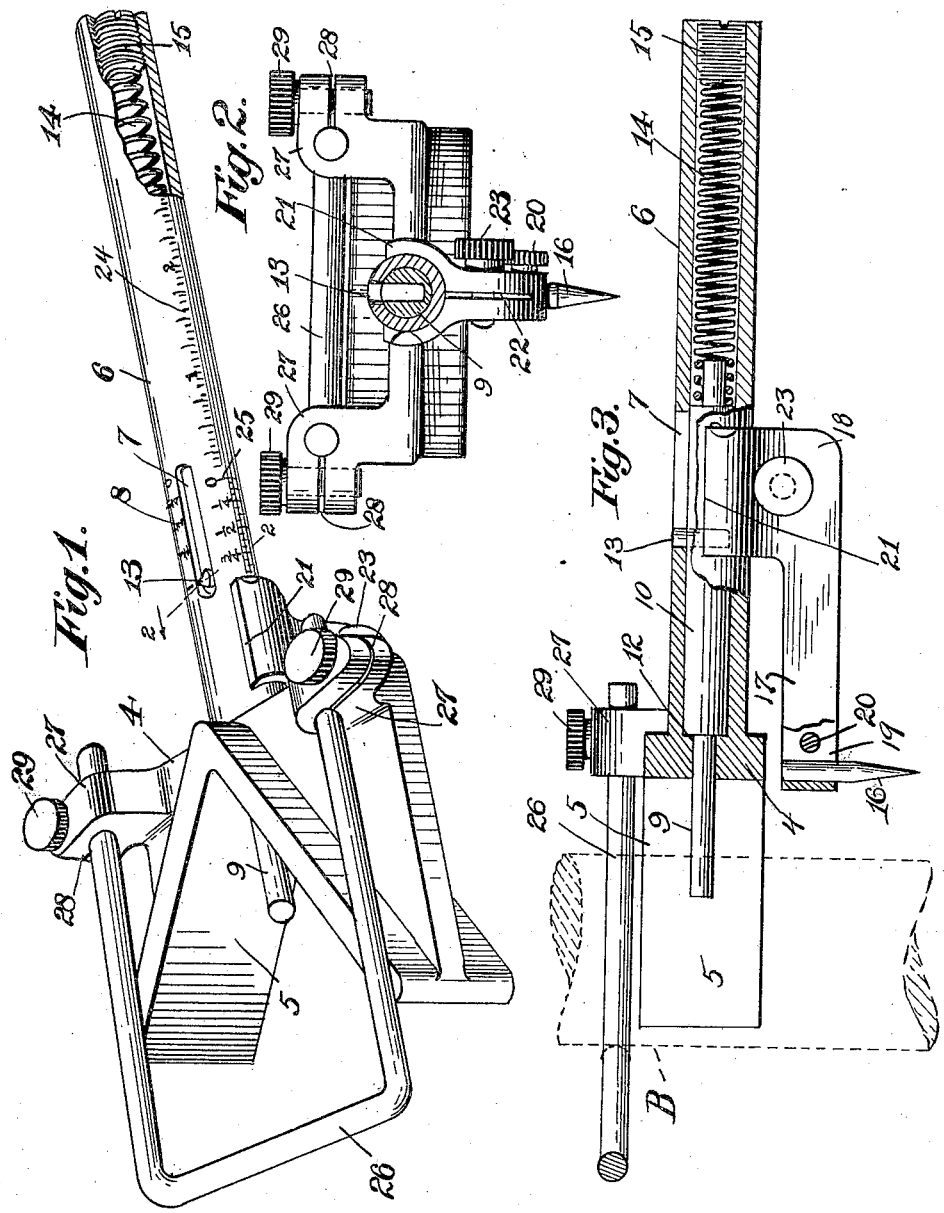
Inventor
R. V. Fusco
By his Attorney
John O. Seifert Patented Aug. 12, 1924.

1,504,683

UNITED STATES PATENT OFFICE.

RUDOLPH V. FUSCO, OF BROOKLYN, NEW YORK.

GAUGE.

Application filed April 25, 1921. Serial No. 464,199.

*To all whom it may concern:*

Be it known that I, RUDOLPH V. FUSCO, a citizen of the United States, and a resident of the borough of Brooklyn, in the county of Kings, city and State of New York, have invented certain new and useful Gauges, of which the following is a specification.

This invention relates to gauges, and it is an object of the invention to provide a gauge to readily and accurately determine the outside diameter of spherical or cylindrical bodies or round stock and indicate the diameter, and to provide a gauge for this purpose which is simple and cheap in construction and efficient in use.

It is another object of the invention to combine with a gauge of this character a scribing gauge to inscribe on a piece of work the line or lines to which the work is to be machined or otherwise worked.

In the drawing accompanying and forming a part of this specification Figure 1 is a perspective view of a gauge, partly in section, illustrating an embodiment of my invention.

Figure 2 is a sectional end view taken on the line 2—2 of Figure 1 looking in the direction of the arrow; and Figure 3 is a longitudinal sectional view and showing the manner of taking or ascertaining the outside diameter of a spherical or cylindrical body.

Similar characters of reference designate like parts throughout the different views of the drawing.

The embodiment of my invention shown in the drawing comprises a gauge member 4 arranged with a pair of gauge faces 5 to be engaged by, or be brought into engagement with, the surface of a convex body the diameter of which is to be determined, said gauge faces diverging in opposite directions at an angle of thirty degrees to a line passing through the vertex of the angle formed by said faces and diametrically through the body engaged by them.

The gauge member 4 is arranged with a portion 6 in the form of a tube secured to the gauge member with the axis thereof in line with a line bisecting the angle formed by the gauge faces 5. This tube has a slot 7 therein with graduations 8 arranged adjacent to said slot reading from right to left as viewed in Figure 1 of the drawing. A plunger 10 is slidably mounted in the tube, said plunger having a portion 9 at one end of reduced diameter to slidably engage in a perforation 12 (Figure 3) in the gauge member 4 co-axially with the bore of the tube and passing through the vertex and bisecting the angle between the gauge faces 5. A pointer 13 passing through the tube slot 7 is fixed in the plunger to participate in the movement thereof and is arranged to co-operate with the graduations 8 for the purpose and in a manner hereinafter set forth. A spring 14 in the tube 6, confined between the end of the plunger and a plug 15 threaded into the end of the tube, normally urges the plunger in a direction toward the gauge 4 with the shoulder of the plunger formed by the reduced portion 9 in engagement with the gauge member, the reduced portion 9 extending into the space between the gauge faces 5 to a predetermined extent which is determined by the length of the reduced portion 9.

In determining the diameter of a spherical or cylindrical body B such as a rod or the like the gauge faces are brought into engagement with the surface of said body. By bringing the gauge faces 5 into contact with the convex body the reduced end 9 of the plunger is forced into the tube against the action of the spring 14, this movement of the body due to the inclination of the gauge faces relative to each other will cause the plunger and pointer be moved in a direction from the left hand end of the tube slot and scale to the right, and the graduations 8 being arranged to be read from the right to the left, a reading of the scale from the right hand end thereof to the point indicated by the pointer, will indicate the radius of the body of which the diameter is being determined and the multiplying of said indication by two will give the diameter of the body. While the graduations are arranged to indicate the radius of a convex body the graduations may be so arranged that the diameter of the body may be determined and read directly from the scale.

To adapt the device as a combined diameter determining and scribing gauge a scribing tool is adjustably mounted upon the tubular member 6. This tool comprises a pointed pin 16 removably mounted to extend at right angles to the axis of the tube in the perforation of an arm 17 which arm extends in a direction parallel with the tube and has a part 18 whereby to mount the same upon the tube to have adjustment thereon. A slot 19 is cut through the wall of the arm perforation and the pin is releasably retained in the perforation by a clamping thumb screw 20 passing through one wall of the slotted wall of the perforation and threaded into the other wall. A portion of the part 18 is cut away, as at 21, to permit of the adjustment of the same past the pointer 13, and has a slotted portion 22 to provide opposite yielding portions to mount the arm upon the tube and for releasably securing the scribing tool in adjusted position on the tubular portion by clamping the same thereto by means of a clamping screw 23.

The scribing tool is adapted for use in inscribing a line or lines to which an article or piece of work, such as a wheel, cam or the like having a hub portion is to be machined or worked, or the same may be utilized in connection with a spindle of a machine tool, such as a lathe, to inscribe a working line on a piece of work mounted in a work holder, such as a chuck, in the machine tool. The scribing tool is normally secured in adjusted position on the tubular member 6 with the scribing pin or tool in line with the vertex of the angle formed by the gauge faces 5 and the forward edge of the portion of the scribing tool carrier whereby it is mounted upon the tube 6 in register with the graduations 24 of a scale arranged on said tubular member, a portion of which scale reads from left to right from the point 25 and another portion from right to left from said point. In adjusting the scribing tool, the distance from the axis or center of the work to the point to which it is to be machined being known, the gauge faces 5 are brought into engagement with the circular surface of the work, such as a hub or the like, when the scribing tool carrying arm is adjusted in a direction outward on the tubular member 6, the known distance minus the diameter of the hub which is ascertained is indicated on the scale 8 by the pointer 13. To set the scribing tool to a distance less than the diameter of the hub portion of the work to be machined the scribing tool is adjusted on the tubular member 6 in a direction from the left of the point 25.

To facilitate the inscribing of a line, such as a complete circle, the gauge may be clamped to the spherical or cylindrical body by means of a clamping member in the form of a yoke 26 bent up to U-shape from a rod, and the gauge 4 is arranged with perforated lugs 27 with a slot 28 cut through a wall of the perforation, the free ends of said yoke being adapted to slidably engage in said lug perforations and be brought up to the body to clamp the same in engagement with the gauge faces 5 and secured in such position by thumb screws 29 co-operating with the slotted portion of the lugs 27 to firmly secure the yoke therein.

Having thus described my invention I claim:

1. A device of the class specified, comprising in combination a gauge member having diverging faces, a tubular portion extending laterally therefrom in a line coincident with the vertex of the diverging faces and arranged with graduations, a plunger slidably mounted in said tubular portion normally yieldingly maintained in position with a portion of the plunger projecting between the gauge faces to a predetermined extent, a pointer carried by the plunger to co-operate with the graduations, a scribing tool, and a carrier therefor mounted on the tubular portion to have adjustment longitudinally thereon and adapted to be secured in variable predetermined positions in relation to a second set of graduations on said tubular portion for the purpose specified.

2. A device of the class specified, comprising in combination a member having a pair of diverging gauge faces, said member being adapted to be brought into contact with the external spherical or cylindrical surface of a body, a tubular portion projecting laterally from the vertex of said faces and arranged with graduations, a plunger slidably mounted in said tubular portion arranged to be engaged and moved by the body as the diverging faces are brought into engagement therewith and carrying a pointer to co-operate with the graduations, a scribing tool, a carrier for the scribing tool mounted on the tubular portion to have rotative movement with respect thereto and to have longitudinal adjustment with relation to a second scale on the tubular portion, and a yoke adapted to be adjustably mounted in perforations in lugs on the gauge member with the connecting portion of the yoke extending transversely of the gauge faces at the end thereof.

Signed at Brooklyn, in the county of Kings, city and State of New York, this 21st day of April, 1921.

RUDOLPH V. FUSCO.